United States Patent [19]

Maezawa et al.

[11] 3,866,103

[45] Feb. 11, 1975

[54] SERVOAMPLIFIER DEVICE

[75] Inventors: Keizo Maezawa; Susumu Ohta, both of Tokyo, Japan

[73] Assignee: Yokagawa Electric Works, Ltd., Tokyo, Japan

[22] Filed: Aug. 10, 1972

[21] Appl. No.: 279,433

[30] Foreign Application Priority Data

Aug. 25, 1971 Japan .............................. 46-64961

[52] U.S. Cl. .................. 318/678, 318/681, 318/684

[51] Int. Cl. .......................... G05f 1/00, G05f 11/12

[58] Field of Search ..................... 318/678, 681, 684

[56] References Cited

UNITED STATES PATENTS

| | | | |
|---|---|---|---|
| 3,103,615 | 9/1963 | Vitale | 318/681 X |
| 3,153,754 | 10/1964 | McDonald | 318/681 |
| 3,430,117 | 2/1969 | Sennhenn | 318/681 X |
| 3,454,850 | 7/1969 | Miller | 318/681 X |
| 3,551,770 | 12/1970 | Isaacs | 318/681 X |
| 3,679,957 | 7/1972 | Farque | 318/681 X |

*Primary Examiner*—T. E. Lynch

*Attorney, Agent, or Firm*—Bryan, Parmelee, Johnson & Bollinger

[57] ABSTRACT

A servoamplifier, of the type accepting a DC input signal and controlling a two-phase AC servomotor therewith, is characterized by a transformerless control circuit capable of obviating errors due to AC line noise and common mode noise. An input circuit, formed by two choppers operated 180° out of phase with each other, converts the DC input signal into two AC signals which are applied to two inputs of a differential-input voltage amplifier which combines the signal into an amplified output signal. This signal is amplified again by a power amplifier and is applied to the control coil of the AC servomotor for driving the servomotor. Means are provided for referring to a common potential the signals existing in the input circuit, the voltage amplifier, the power amplifier, and the control coil of the servomotor, which effectively eliminates, without the use of an isolating transformer, noise signals causing misoperation of the servomotor. In further aspects, the servoamplifier dispenses with the need for a power capacitor by employing a phase shifting circuit to operate the choppers, and prevents a hazardous reflection of energy from an AC power source into the control circuit by driving the servomotor through a power transformer.

7 Claims, 4 Drawing Figures

SERVOAMPLIFIER DEVICE

BACKGROUND OF THE INVENTION

1. Field of the Invention

The present invention relates to servoamplifiers, and more particularly to servoamplifiers of the type accepting a DC signal and driving a two-phase AC servomotor in accordance with the amplitude of the DC input signal. input 2. Description of the Prior Art Servoamplifiers of the type described commonly convert the DC signal with a chopping circuit into an AC signal which is then amplified and applied to the control coil of the AC servomotor. In order to counteract problems of servomotor error arising from Ac line noise induced between the input lines, or common mode noise induced between the input lines and ground, several different approaches have been taken.

To remove the AC line noise, filters have been used. However, filters do not remove all AC line noise, and if such noise is induced at the frequency of the power source driving the servomotor, the noise is likely to actuate the servomotor in error.

To remove common mode noise, it has been the practice to use an isolating transformer between the chopping circuit and amplifiers, or between a voltage amplifier and a power amplifier, so as to provide a reference potential for the servomotor which is independent of voltages existing between the input lines and ground. Typically, however, such a transformer introduces a stray capacity ascribable to the transformer coils which disturbs servomotor operation. To solve this problem, the transformer must be especially manufactured, at extra cost. An additional problem exists in that the core of the transformer tends to respond to external induction fields to introduce noise into the circuit. The use of such transformers further prevents any substantial size reductions of the servoamplifier device to fully take advantage of size reductions permitted by available integrated circuits.

In addition to the foregoing problems in counteracting various sources of noise, servoamplifiers have used a phase shifting capacitor in series with the servomotor's excitation coil in order to provide the necessary 90° phase difference between the servomotor control signal and excitation signal. To produce the necessary phase shift for the power signal, the capacitor must have a large capacity and a high breakdown rating, which add to bulk an expense.

Furthermore, where the servomotor excitation coil is connected to the AC power source which may have, for example, a value of 100 volts, hazardous energy levels can pass from the AC power source by induction through the servomotor excitation coil and control coil into the servomotor control circuit and into the area where the DC input signal is generated. If this area contains a hazardous environment, such as an explosive gas, the transferred energy will create an unsafe situation. To protect against this problem, servoamplifiers have placed a shield between the control coil and the excitation coil of the servomotor. As a practical matter, however, the coils cannot be shielded perfectly because of the servomotor structure, and an isolating transformer has been placed between the chopping circuit and the servomotor, again raising the problems mentioned previously of stray capacity in the transformer coils and noise induced in the transformer core.

SUMMARY OF THE INVENTION

A principal object of the present invention is to provide a servoamplifier dispensing with a transformer between the input and the servomotor, and yet which is able to operate without errors due to noise signals. Other objects of the invention are to provide a servoamplifier dispensing with a large capacity, high breakdown rating capacitor for phase shifting the excitation signal, and to provide a servoamplifier able to prevent hazardous energy levels from being transmitted into the area where the DC input signal is generated, without requiring the use of a transformer between that area and the servomotor.

According to the invention, the servoamplifier is characterized by a transformerless control circuit accepting the DC input signal and controlling the AC servomotor therewith and which obviates errors due to noise signals. The servoamplifier comprises an input circuit, formed for example with two choppers operated 180° out of phase, for converting the DC input signal into two 180° out of phase AC signals. The AC signals are applield to a differential-input voltage amplifier which combines them into an amplified output signal which is again amplified in a power amplifier and applied to the control coil of the AC servomotor for driving the AC servomotor. The control circuit is arranged with means, such as a common conductive line, which refers to a common potential the individual signals in the input circuit, the voltage amplifier, the power amplifier, and the control coil of the servomotor, to effectively eliminate the effects of noise signals without an isolating transformer or filter. In another aspect, the servoamplifier connects the excitation coil of the servomotor in parallel phase relation with an AC power source, and operates the two choppers with control signals which are derived from the AC power source and are phase shifted by 90°, thereby permitting smaller and more inexpensive phase shifting capacitors to be used. In still another aspect, the Ac power source is connected to the excitation coil through a shielded power transformer to prevent the transmission of hazardous energy levels though the control circuit.

Other objects, aspects and advantages of the invention will be pointed out in, or apparent from, the detailed description hereinbelow, considered together with the following drawings.

DESCRIPTION OF THE PREFERRED EMBODIMENTS

Figure 1:
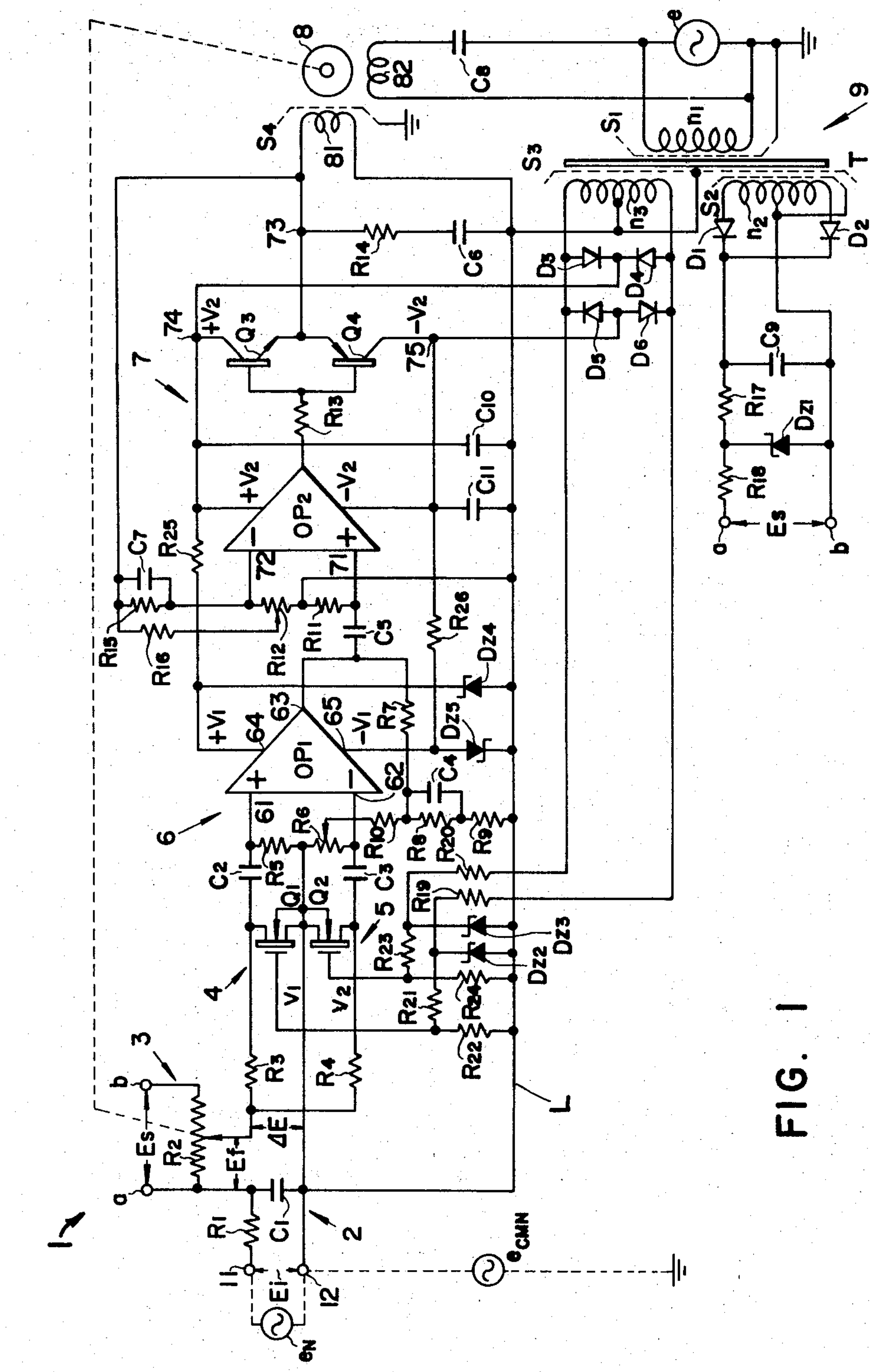
FIG. 1 is a circuit diagram illustrating a servoamplifier according to the present invention.

FIG. 1 illustrates a servoamplifier 1 constructed according to the invention and having input terminals 11 and 12 across which a DC input signal Ei is applied. The signal Ei is derived, for example, from a sensor located in a sensing area, and governs the operation of a servomotor 8 as will be explained below.

The DC input signal Ei is applied to a filter circuit 2 comprising a resistor R1 and a capacitor C1. The voltage Ei across capacitor C1 appears in series with a feedback voltage Ef provided by a feedback voltage generator circuit 3 using a slide resistor R2, across which a stabilized DC voltage Es is applied. The brush of the slide resistor R2 is mechanically driven by the two-phase AC servomotor 8. The deviation voltage $\Delta E = Ei - Ef$ is applied to the inputs of two choppers 4 and 5, respectively comprising field effect transistors Q1 and Q2. These transistors have their drains connected to the brush of the slide resistor R2 through resistors R3 and R4, and have their sources connected to the common line L to which input terminal 12 is connected. The transistors Q1 and Q2 are turned on and off alternately by separate gating signals *v*1 and *v*2 applied to their gates. As will be explained below, the gating signals *v*1 and *v*2 are square half wave signals 180° out of phase with each other.

The outputs of choppers 4 and 5, which are AC signals *e*1 and *e*2 180° out of phase and with amplitudes corresponding to the amplitude of the deviation signal Δ E, are applied to a differential-input voltage amplifier 6 comprising a linear IC operational amplifier OP1. The output terminals 61 and 62 of the voltage amplifier 6 are connected through coupling capacitors C2 and C3, respectively, to the output terminals of the choppers 4 and 5, i.e., to the drains of the field effect transistors Q1 and Q2. It should be noted that the use of field effect transistors at the input stage of the voltage amplifier 6 permits the coupling capacitors C2 and C3 to be omitted if desired and hence the input terminals 61 and 62 may be connected directly to the output terminals of the choppers 4 and 5. The input terminals 61 and 62 are connected to the common line L via resistors R5 and R6 with equal resistance values. The voltage amplifier 6 is driven by stabilized positive and negative DC voltages +V1 and −V1 applied to the amplifier's power terminals 64 and 65 respectively.

The output terminal 63 of the voltage amplifier 6 is connected to the common line L through a filter circuit comprising resistor R7, a parallel circuit formed by resistor R8 and capacitor C4, and a resistor R9. The connection point of resistors R7 and R8 is connected to a brush supplied on resistor R6 and thus a negative feedback signal is applied to the voltage amplifier 6 in its DC and low frequency operating regions. The purpose of this negative feedback is as follows. Because of an offset voltage existing in the linear IC operational amplifier OP1, its output is saturated for inputs in the vicinity of zero on the DC input-output characteristic. This hampers normal amplifying functions of the device. The solution achieved by the present invention is to lower the amplifier gain in the DC and low frequency regions by applying a negative feedback and thus to shift the zero input area to the linear region of amplifier operation. By this arrangement the influence of the offset voltage is removed and normal amplifying functions are maintained.

The signal appearing at the output 63 of voltage amplifier 6 is a combined AC signal *e*3 which is applied through a coupling capacitor C5 to an input terminal 71 of a power amplifier 7, which is a differential-input single-ended circuit comprising a linear IC operational amplifier OP2 connected through a resistor R13 to the bases of transistors Q3 and Q4 arranged in complementary symmetry. The amplifier's input terminals 71 and 72 are connected to the common line L through resistors R11 and R12 of equal resistance values. The transistors Q3 and Q4 have their emitters connected to the output terminal of amplifier 7, which is connected to the common line L through a series circuit formed by resistor R14 and capacitor C6. The power amplifier 7 is driven by positive and negative DC voltages +V2 and −V2 applied to its power terminals 74 and 75.

The output terminal 73 of amplifier 7 is connected to the amplifier's input terminal 72 through a parallel circuit comprising resistor R15 and capacitor C7, and also through a resistor R16 connected to a brush supplied on resistor R12. A negative feedback thus is applied to the input terminal 72 from the output terminal 73, to keep the output terminal impedance of amplifier 7 low (e.g., several ohms or lower). This arrangement serves to improve the damping of the two-phase Ac servomotor 8 and to dispense with the need for a rate generator.

The two-phase AC servomotor 8 has its control coil 81 connected between the output terminal 73 of the power amplifier 7 and the common line L, and has its excitation coil 82 connected to an AC power source *e* thorugh a 90° phase shifting capacitor C8. A grounded shield S4 is provided between the control coil 81 and the excitation coil 82.

The gating voltages *v*1 and *v*2, the power supply voltages +V1, −V1 and +V2, −V2, and the stabilized DC voltage Es, are provided by a power source circuit 9 in which a power transformer T has the AC voltage source *e*, for example 100V, connected across its primary coil n1. The voltage induced in the transformer's first secondary coil *n*2 is full wave rectified by diodes D1 and D2 and smoothed by a capacitor C9. After passing through a resistor R17, this voltage is stabilized by a zener diode Dz1 and becomes the stabilized DC voltage *E*s, which is applied across the slide resistor R2 via a resistor R18, with the indicated connection of terminals *a*, *b* showing the polarity of connection.

The neutral point of the transformer's second coil *n*3 is connected to the common line L. The voltage induced in the secondary coil *n*3 is clipped by zener diodes Dz2 and Dz3 after passing through resistors R19 and R20, to provide two half-wave square voltages which are 180° out of phase. These voltages are passed through respective voltage dividing networks comprising resistors R21 and R22, and R23 and R24, to become the gating signals *v*1 and *v*2 which drive the field effect transistors Q1 and Q2 with a phase difference of 180°.

The voltage induced in the secondary coil *n*3 is also full-wave rectified in one polarity by diodes D3 and D4, and in the other polarity by diodes D5 and D6, and then the two rectified voltages are smoothed by capacitors C10 and C11 to provide the positive and negative DC voltages +V2 and −V2 which are supplied to the power terminals 74 and 75 of the power amplifier 7. The DC voltages +V2 and −V2 are applied to voltage-dropping resistors R25 and R26 and are then stabilized by zener diodes Dz4 and Dz5 to produce the stabilized positive and negative DC voltages +V1 and −V1 which are supplied to the power terminals 64 and 65 of the voltage amplifier 6.

In order to prevent hazardous energy from entering the secondary side of transformer T from the AC power source *e*, a grounded shield S1 is provided on the primary side of the core. In addition, a shield S2 is provided for the first secondary coil *n*2, and a shield S3 for the first and second secondary coils $n2$ and $n3$. The shield S3 is connected to the common line L.

Figure 2:
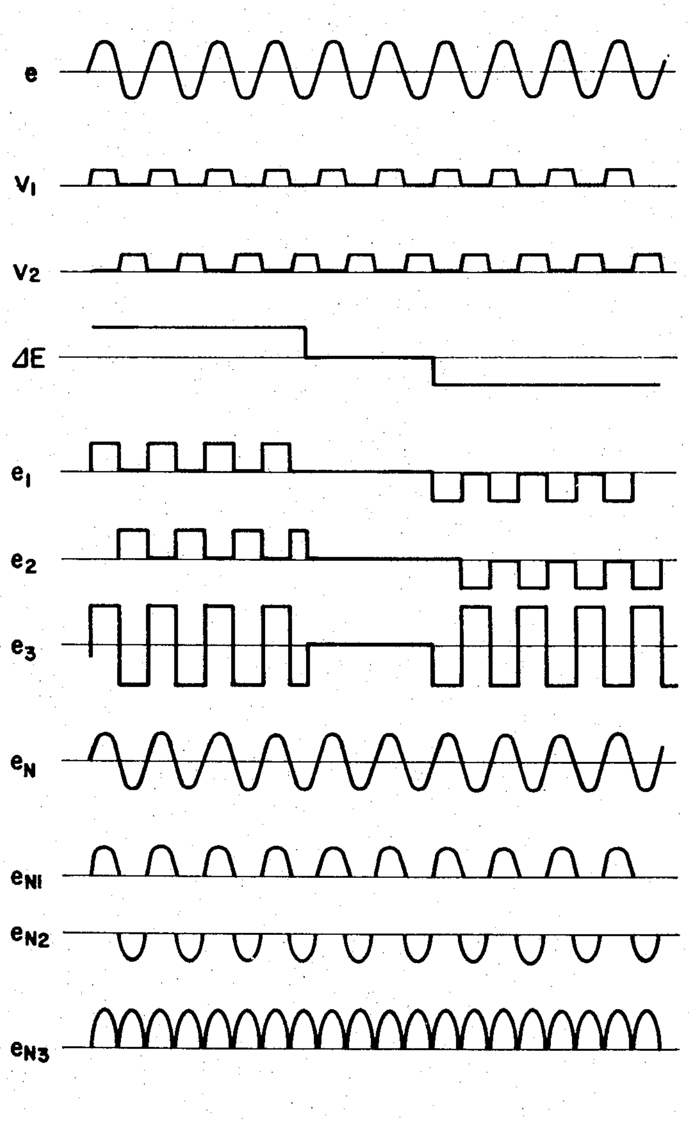
FIG. 2 is a graphic diagram of wave forms existing at various places in the circuit of FIG. 1, the wave forms being depicted with a common horizontal time scale.

The servoamplifier 1 of this invention is operated in the following manner, producing therein the waveforms shown in FIG. 2. In the choppers 4 and 5, the field effect transistors Q1 and Q2 are turned on alternately by the signals $v1$ and $v2$ which are 180° out of phase with each other. The deviation Δ E between the DC input signal Ei and the DC feedback voltage Ef is converted into AC signals $e1$ and $e2$ whose waveforms are as shown in FIG. 2. These AC signals are supplied to the input terminals 61 and 62 of the differential input voltage amplifier 6 by way of the coupling capacitors C2 and C3 respectively. The voltage amplifier 6 amplifies in phase the input to its terminal 61, and in inverse phase the input to its terminal 62. As a result, the AC signals $e1$ and $e2$ are combined together at the output terminal 63. This signal is an output $e3$ having a symmetrical wave as shown in FIG. 2. The frequency of this output is the same as the AC power source frequency, and the amplitude and phase correspond to the value and polarity of the deviation Δ E.

The square output signal $e3$ is amplified by the power amplifier 7, and then is applied to the control coil 81 of the two-phase AC servomotor 8. The servomotor 8 rotates in forward or reverse directions according to the phase and amplitude of the signal $e3$. When the servomotor rotates, the brush of the slide resistor R2 moves and the feedback voltage Ef changes to balance the input signal Ei and to reduce the deviation ΔE.

When an Ac line noise $e$N at the frequency of the AC power source e is applied across the input terminals, AC noise signals $e$N1 and $e$N2 as shown in FIG. 2 are induced at the output terminals of the choppers 4 and 5 respectively. These noises are combined together by the differential-input voltage amplifier 6 and become an AC noise signal $e$N3 as shown in FIG. 2, whose frequency is twice the power source frequency. Accordingly, the AC noises $e$N1 and $e$N2 cannot serve to supply torque for the servomotor 8, and the servomotor 8 does not rotate even if an AC line noise of power source frequency is induced between the input terminals. Thus, by using two out of phase choppers to provide inputs to a differential-input voltage amplifier 6, the servomotor is rendered virtually unaffected by the AC line noise induced between the input terminals.

If, as shown in FIG. 1, a common mode noise $e$CMN is induced between an input terminal and ground, an undesirable current may flow in the circuit due to leakage resistance and stray capacity. To solve this problem, the prior art has generally used a transformer to isolate the input circuit from the servomotor. According to the present invention, however, the individual signal reference points of the input terminal 12, the choppers 4 and 5, voltage amplifier 6, the power amplifier 7, the control coil 81 of servomotor 8, and the secondary coil $n3$ of power transformer T are all connected to the common line L, thus maintaining in common the potentials at these reference points. As a result, any common mode noise $e$CMN will be grounded through the common line L by leakage resistance and stray capacity. Undesirable current due to the common mode noise will not flow in the signal processing portion of the circuit, and the servomotor will be substantially free of its influence.

Current due to the common mode noise $e$CMN passing through the common line L will create a voltage drop because of the line resistance of the common line L, and this may become a noise. The present invention solves this problem by balancing the inputs to the differential-input amplifier 6 and the power amplifier 7 by connecting their input terminals to the common line L via equal resistors R5, R6 and R11 and R12, respectively. In consequence, the voltage drop due to the line resistance of the common line L is cancelled by the amplifiers and its influence disappears at the output terminal to the servomotor. Thus, by balancing the inputs of the differential-input amplifier 6 about the means for maintaining the reference points in common, the common mode noise $e$CMN is effectively removed to make it possible to dispense with the conventional isolating transformer and its accompanying problems.

One possible path for AC noise to enter the servomotor control circuit is from the AC power source $e$ by way of the stray capacity of the primary and secondary coils of the power transformer T. According to the present invention, however, the shield S3 on the secondary side of the transformer T is connected to the common line L, and any AC noise induced via the power transformer T flows only through the common line L and has no influence upon the servomotor control circuit.

Because the reference points of the choppers 4 and 5, voltage amplifier 6, power amplifier 7, and secondary coil $n3$ of power transformer T are connected to the common line L, the power for driving the choppers 4 and 5, voltage amplifier 6, and power amplifier 7 can be derived from the same secondary coil $n3$ of the power transformer T. This enables the power source circuit 9 to be simplified and further enables the shielding of the secondary coil to be simplified.

Figure 3:
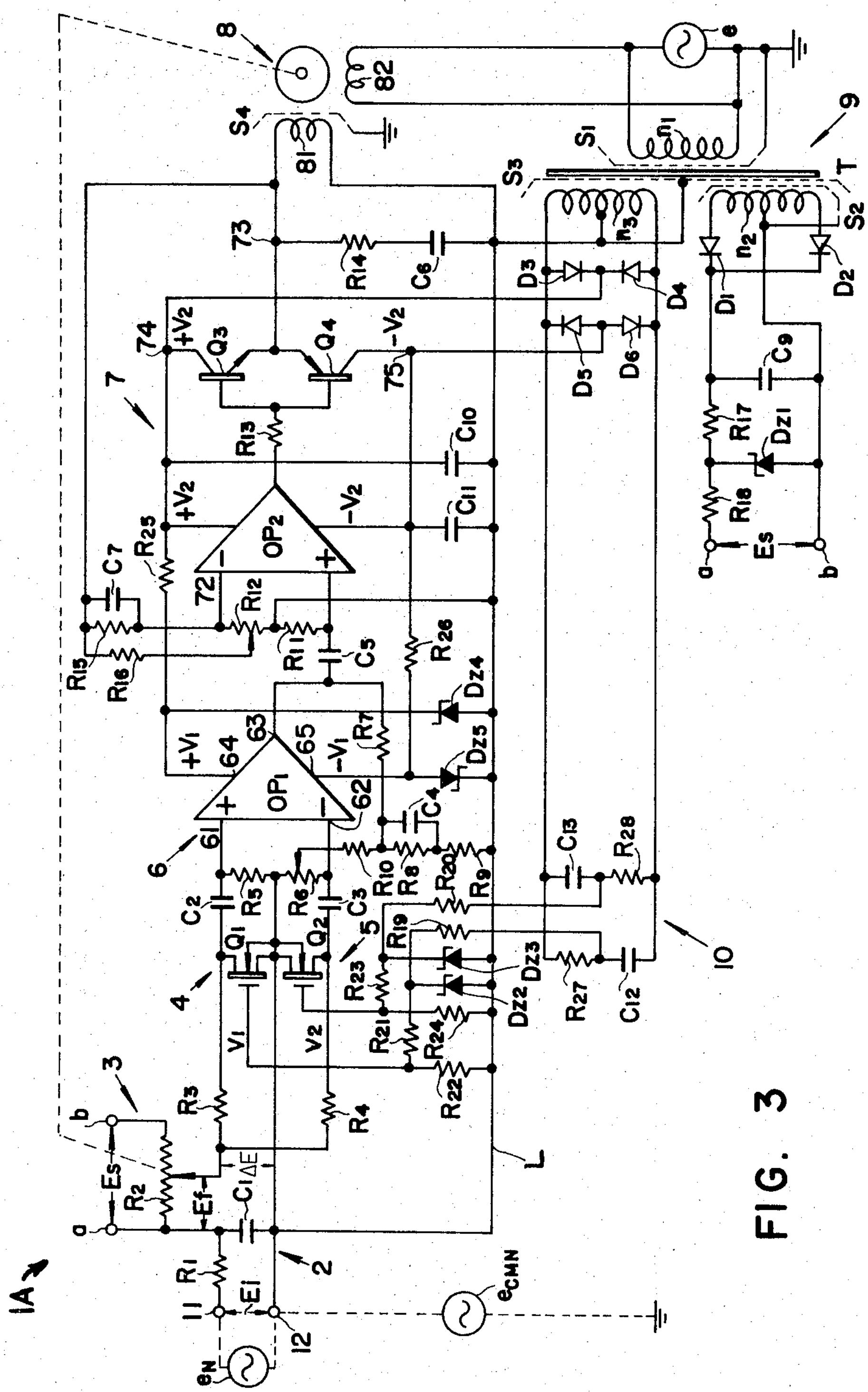
FIGS. 3 and 4 are circuit diagrams of other embodiments of servoamplifiers according to the invention.

FIG. 3 illustrates another servoamplifier 1A according to the invention. This embodiment differs from the servoamplifier 1 of FIG. 1 in that a phase-shifting circuit 10, comprising RC circuits formed by resistors R27 and R28 and capacitors C12 and C13, is disposed between the choppers 4 and 5 and the power transformer T. The phase shifting circuit 10 provides the necessary 90° phase difference between the signals applied to the control coil 81 and exciting coil 82 of servomotor 8, and obviates the need for the conventional large-capacity phase-shifting capacitor C8 in series with the exciting coil 82. Since the signals for driving the choppers have different phases, the circuit elements of the phase-shifting circuit 10 may be small in capacity, and a substantial reduction in the overall size of the device is thus obtainable.

Figure 4:
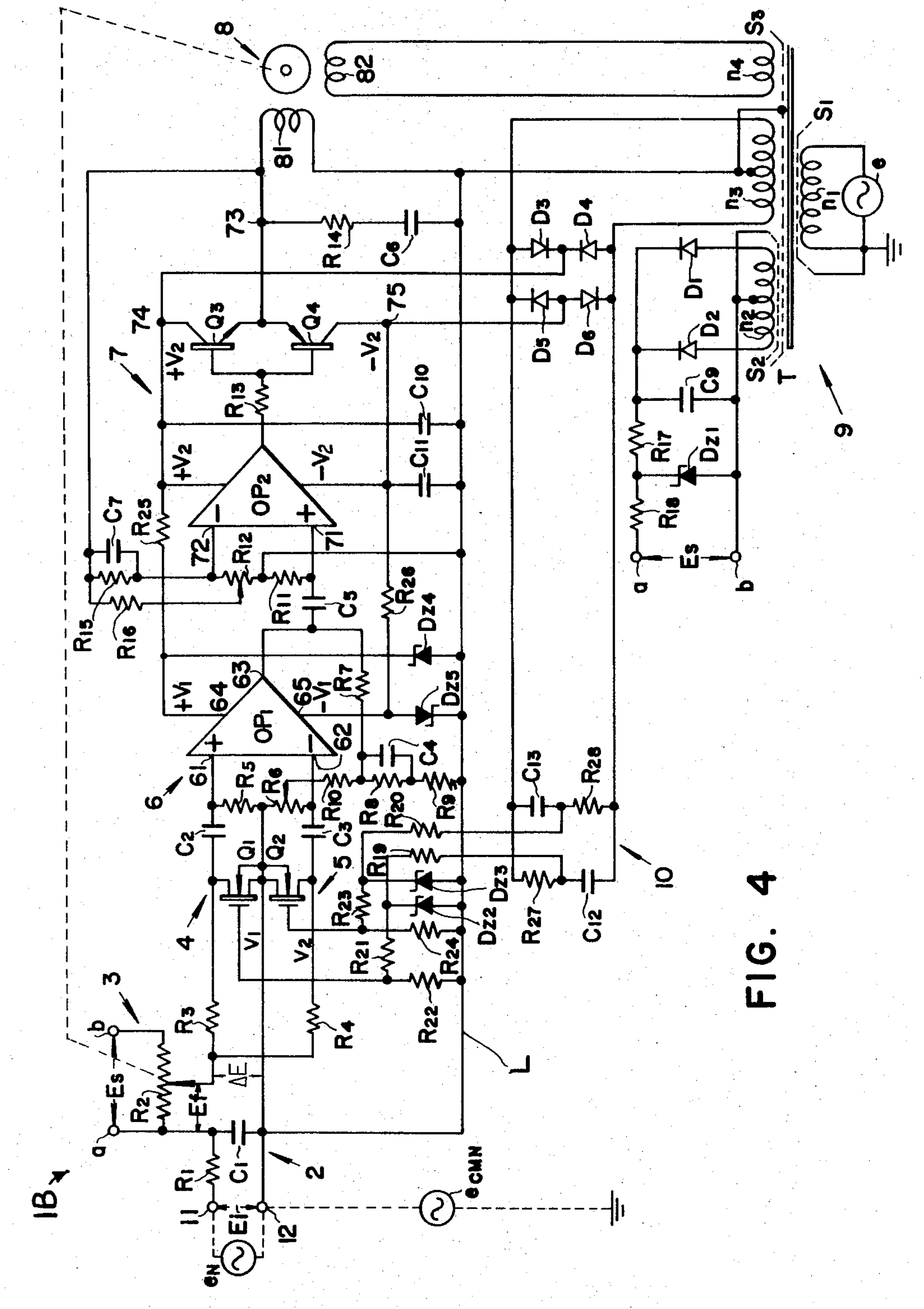

Another servoamplifier 1B according to the invention is shown in FIG. 4. If no transformer is used for isolating the input circuit from the servomotor, and if the excitation coil of the servomotor is connected directly to the AC power source $e$, it is possible for hazardous energy levels to pass through the control circuit and to enter a hazardous area connected to the input circuit as a result of induction due to the excitation coil 82 and coil 81 of the servomotor. In servoamplifiers 1 and 1A shown in FIGS. 1 and 3, such energy passage is prevented by a shield S4 disposed between the control coil 81 and the excitation coil 82 of the servomotor 8. Perfect shielding, however, cannot be realized because of structural limitations inherent in the servomotor. In servomotor 1B of FIG. 4, the transmission of hazardous energy levels is prevented by providing a voltage-reducing third secondary coil $n4$ for the power transformer T, and by connecting the excitation coil 82 of the servomotor directly to the secondary coil *n*4. The turns ratio of secondary coil *n*4 to primary coil *n*1 is such that, for example, an AC voltage of about 15V, transformed from AC 100V, is applied to the excitation coil 82. The servomotor 8 thus is excited via the power transformer T which isolates the excitation coil from the power source. In transformer T, secondary coil *n*4 is shielded by shield S3 in common with the other secondary coils *n*2 and *n*3.

Thus in servoamplifier 1B any hazardous energy from the AC power source *e* is advantageously prevented from entering a hazardous input area by way of the control coil 81 and the excitation coil 82, and this embodiment is highly suitable for use as an intrinsically safe circuit where no transformer is to be used for isolating the input circuit from the servomotor. In addition, this embodiment dispenses with the need for a shield between the control coil and the excitation coil of the servomotor.

As will be apparent, many modifications to the servoamplifiers 1, 1A, and 1B may be made. For example, in place of the single field effect transistor used in parallel configuration for each of the choppers 4 and 5, two field effect transistors may be used for each chopper in series-parallel configuration, or another chopper arrangement may be used.

Thus, although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. Apparatus for operating an AC servomotor having control and exciting coils, the apparatus being arranged to accept an AC power signal from an AC power source and arranged to accept a DC input signal and to control the AC servomotor therewith through a transformerless control circuit having reduced susceptibility to errors due to noise, comprising:

a common potential reference line;

an input circuit for comparing the DC input signal with a feedback signal controlled by the servomotor to obtain a difference signal referred to the common potential line and including chopper means balanced about the common potential line for converting the difference signal into two 180° out of phase signals referred to the common potential line and having amplitudes varying with the amplitude of the difference signal;

a differential-input voltage amplifier having two differential inputs balanced about the common potential line and receiving the two AC signals on the two differential inputs and combining them into an AC output signal with amplitude and phase varying with the amplitude of the difference signal;

a power amplifier for amplifying the output of the voltage amplifier to produce a signal referred to the common potential line to be applied to the control coil of the AC servomotor for driving the AC servomotor;

power transformer means for coupling the AC power source to the servomotor exciting coil to isolate the AC power source from the servomotor exciting coil and to apply a signal to the exciting coil in phase with the AC power source signal, and means connected to the AC power source and including a 90° phase shifting circuit for operating the chopper means 90° out of phase with respect to the AC power source signal, whereby AC input noise signals and common mode noise signals are effectively elminated without an isolating transformer between the input circuit and the servomotor, and whereby safe operation of the servomotor is afforded.

2. Apparatus as claimed in claim 1 wherein said choppers comprise elements gated into conduction by control signals which are 180° out of phase and provided by the chopper operating means, said chopper operating means comprising a first halfwave rectifier receiving the AC power source signal, a second opposite polarity halfwave rectifier receiving the AC power source signal, phase shifting means for delaying the two out of phase rectifier signals, clipper means for squaring the two phase shifted rectified signals, the two squared, phase shifted, rectified signals forming the control signals for the conductive chopper elements.

3. Apparatus as claimed in claim 1 further comprising shielding means in the power transformer for additionally isolating the servomotor exciting coil from the AC power source, whereby hazardous energy levels are prevented from being applied to the control circuit through the servomotor.

4. Apparatus as claimed in claim 1 wherein the voltage amplifier is a linear operational amplifier having its positive and negative input terminals balanced with equal resistances about the common potential line, and has an output terminal, and negative feedback means connecting the output terminal to the negative input terminal for applying a negative feedback signal for DC and low frequency operation.

5. Apparatus as claimed in claim 4 wherein said negative feedback means comprises a filter circuit.

6. Apparatus as claimed in claim 1 wherein the power amplifier comprises an operational amplifier with negative and positive input terminals balanced about the common potential line with equal resistances and an output terminal, complementary transistors connected to the operational amplifier output terminal, and negative feedback means connecting the output of the complementary transistors to the operational amplifier negative input terminal, whereby the output impedance of the power amplifier is reduced.

7. Apparatus as claimed in claim 1 wherein the voltage amplifier comprises an operational amplifier with its positive and negative input terminals joined by equal-valued resistors in series, the junction of the resistors being connected to the common potential line, the power amplifier comprises an operational amplifier having its positive and negative input terminals joined by equal valued resistors in series, the junction of the resistors being connected to the common potential line, and one end of the servomotor control coil is connected to the common potential line.

* * * * *